United States Patent
Schmid et al.

(10) Patent No.: US 7,163,073 B2
(45) Date of Patent: Jan. 16, 2007

(54) AIR INLET CONDUIT FOR A COOLER OF A VEHICLE

(75) Inventors: Markus Schmid, Moensheim (DE); Martin Grammer, Ludwigsburg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/014,844

(22) Filed: Dec. 20, 2004

(65) Prior Publication Data
US 2005/0133287 A1  Jun. 23, 2005

(30) Foreign Application Priority Data
Dec. 19, 2003  (DE) ................................ 103 59 769

(51) Int. Cl.
*B60K 13/02* (2006.01)
*B60K 11/00* (2006.01)
(52) U.S. Cl. .................................... 180/68.3; 180/68.1
(58) Field of Classification Search .............. 180/68.1, 180/68.2, 68.3, 68.4, 69.22, 69.25, 69.24, 180/337, 273; 165/44; 123/41.62, 41.1; 454/130, 128, 151
See application file for complete search history.

(56) References Cited

U.S. PATENT DOCUMENTS

| | | | | |
|---|---|---|---|---|
| 2,050,451 A | * | 8/1936 | Nallinger | .................... 180/68.1 |
| 4,646,864 A | * | 3/1987 | Racchi | ..................... 180/69.22 |
| 4,681,178 A | | 7/1987 | Brown | |
| 4,689,060 A | * | 8/1987 | Koske | ......................... 180/68.3 |
| 4,690,204 A | * | 9/1987 | Reichel et al. | ........... 123/41.62 |
| 4,932,490 A | * | 6/1990 | Dewey | ........................ 180/68.3 |
| 4,969,533 A | * | 11/1990 | Holm et al. | ................ 180/68.4 |

(Continued)

FOREIGN PATENT DOCUMENTS

DE            85 31 720.9 U1      1/1986

(Continued)

OTHER PUBLICATIONS

European Search Report Dated Oct. 27, 2005 With English Language Translation (Four (4) Pages).

*Primary Examiner*—Hau Phan
(74) *Attorney, Agent, or Firm*—Crowell & Moring LLP

(57) ABSTRACT

An air inlet conduit for a cooler of a vehicle has an air conduction scoop inserted into an opening of a vehicle body skin part on its air inlet side. The air inlet conduit is supported by way of a surrounding collar section on an exterior side of the vehicle body skin part, a scoop section extending away from an outer collar section of the air conduction scoop, which scoop section projects into a hollow space of the vehicle body skin part situated behind the latter. The air conduction scoop is connected to an adjoining closed flow-through conduit. So that, during the mounting of the air conduction scoop and/or of the flow-through conduit without any gauge and independently of worker skills, a constant gap is always ensured between the air conduction scoop and the adjoining vehicle body skin part, several trim lugs, which are arranged in pairs on the edge of the opening and project into the opening, are provided. The trim lugs interact in a form-locking manner with positioning pins or positioning sections of the air conduction scoop and/or of the flow-through conduit.

23 Claims, 6 Drawing Sheets

U.S. PATENT DOCUMENTS

| | | | |
|---|---|---|---|
| 5,152,365 A * | 10/1992 | Aoshima | 180/68.3 |
| 5,579,858 A * | 12/1996 | Petersen et al. | 180/68.3 |
| 5,794,733 A * | 8/1998 | Stosel et al. | 180/68.1 |
| 6,439,328 B1 * | 8/2002 | Vaillancourt et al. | 180/68.1 |
| 6,514,136 B1 * | 2/2003 | Hanaya et al. | 180/68.3 |
| 6,991,531 B1 * | 1/2006 | Wijaya et al. | 454/130 |

FOREIGN PATENT DOCUMENTS

| | | |
|---|---|---|
| DE | 42 38 725 A1 | 5/1994 |
| DE | 199 26 862 A1 | 12/2000 |
| DE | 199 26 862 | 7/2002 |
| EP | 1 060 933 A1 | 12/2000 |

* cited by examiner

AIR INLET CONDUIT FOR A COOLER OF A VEHICLE

This application claims the priority of German Application No. 103 59 769.7-22 filed Dec. 19, 2003, the disclosure of which is expressly incorporated by reference herein.

The invention relates to an air inlet conduit for a cooler of a vehicle. Preferred embodiments of the invention relate to an air inlet conduit for a cooler of a vehicle, which on its air inlet side has an air conduction scoop inserted into an opening of a vehicle body skin part and is supported by way of a surrounding collar section on an exterior side of the vehicle body skin part, a scoop section extending away from the outer collar section of the air conduction scoop, which scoop section projects into a hollow space of the vehicle body skin part situated behind the skin part, the air conduction scoop being connected to an adjoining closed flow-through conduit.

Such an air inlet conduit is disclosed in German Patent Document DE 199 26 862 C2 and comprises an air conduction scoop and an adjoining flow-through conduit. In this arrangement, the air conduction scoop is inserted from the outside into the opening of the vehicle body skin part. In this case, fixing noses locally provided on the air conduction scoop are to be supported on a second step-shaped indentation of the vehicle body skin part, so that, in a surrounding manner, a constant gap measurement is achieved between the edge of the air conduction scoop and the vehicle body skin part.

The double step-shaped indentation at the edge area of the opening of the vehicle body skin part is produced in several successive process steps. In the area of the second step-shaped indentation, relative high tolerances therefore occur so that a constant surrounding gap between the edge of the air conduction scoop and the vehicle body skin part can be acheieved only by increased mounting expenditures or by additional working.

It is an object of the invention to provide a fastening concept for the air conduction scoop and/or the flow-through conduit by means of which, without any gauge and independently of worker skills, a constant position of the air conduction scoop and/or of the flow-through conduit relative to the vehicle body skin part is always ensured.

According to the invention, this object is achieved by providing an air inlet conduit for a cooler of a vehicle, which on its air inlet side has an air conduction scoop inserted into an opening of a vehicle body skin part and is supported by way of a surrounding collar section on an exterior side of the vehicle body skin part, a scoop section extending away from the outer collar section of the air conduction scoop, which scoop section projects into a hollow space of the vehicle body skin part situated behind the skin part, the air conduction scoop being connected to an adjoining closed flow-through conduit, wherein several trim lugs are arranged in pairs on an edge of the opening and project into the opening, said trim lugs interacting in a form-locking manner with positioning pins or positioning sections of the air conduction scoop and/or of the flow-through conduit.

Additional advantageous features with preferred embodiments of the invention are described herein and in the claims.

Advantages achieved by means of certain preferred embodiments of the invention are that, as a result of the arrangement of several trim lugs produced in one working cycle on the edge area of the opening of the vehicle body skin part, the air conduction scoop and the flow-through conduit are always positioned correctly, specifically without any gauge and independently of workers. According to certain preferred embodiments of the invention, all trim lugs are produced in a single working cycle and ensure that a constant surrounding gap exists between the air conduction scoop and the vehicle body skin part. As a result of the exact positioning of the flow-through conduit according to certain preferred embodiments of the invention, the latter can rapidly and easily be fastened to the vehicle body skin part. According to certain preferred embodiments of the invention, in the rearward area, the air conduction scoop is connected by means of at least one spring element with the vehicle body skin part and is held in position by means of additional releasable detent connections on the flow-through conduit. According to certain preferred embodiments of the invention, the components of the detent connections are provided on the interior holding frame of the air conduction scoop and on an end-side frame part of the flow-through conduit and can therefore already be assembled outside the vehicle.

An embodiment of the invention is illustrated in the drawing and will be described in detail in the following.

Other objects, advantages and novel features of the present invention will become apparent from the following detailed description of the invention when considered in conjunction with the accompanying drawings.

DETAILED DESCRIPTION OF THE DRAWINGS

Figure 1:
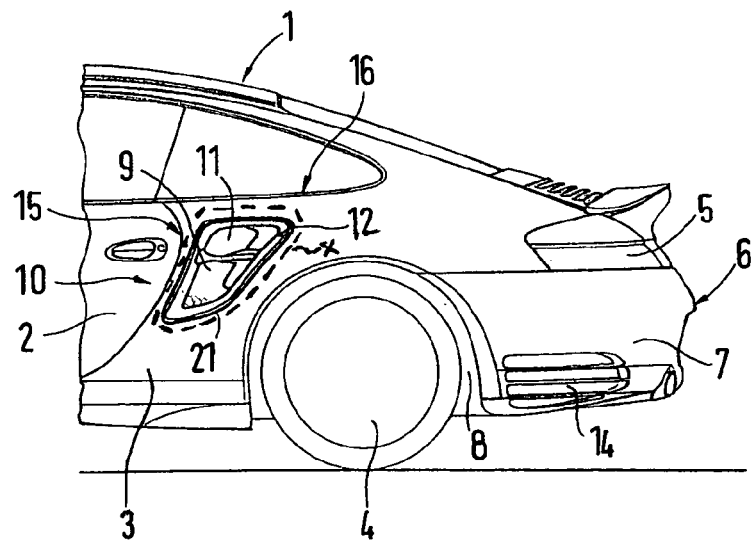
FIG. 1 is a partial view of a passenger car with an air conduction scoop of an inlet conduit for a cooler, which air conduction scoop is inserted into an opening of a vehicle body skin part, constructed according to a preferred embodiment of the invention.
Figure 2:
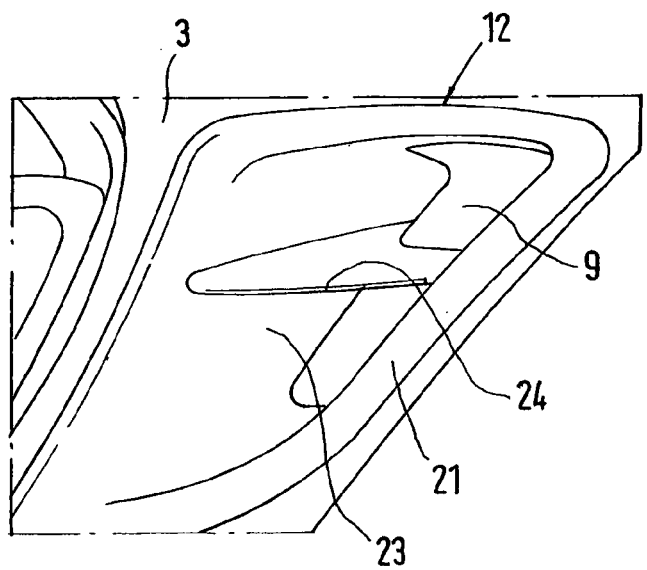
FIG. 2 is an enlarged view of a detail X of FIG. 1.
Figure 3:
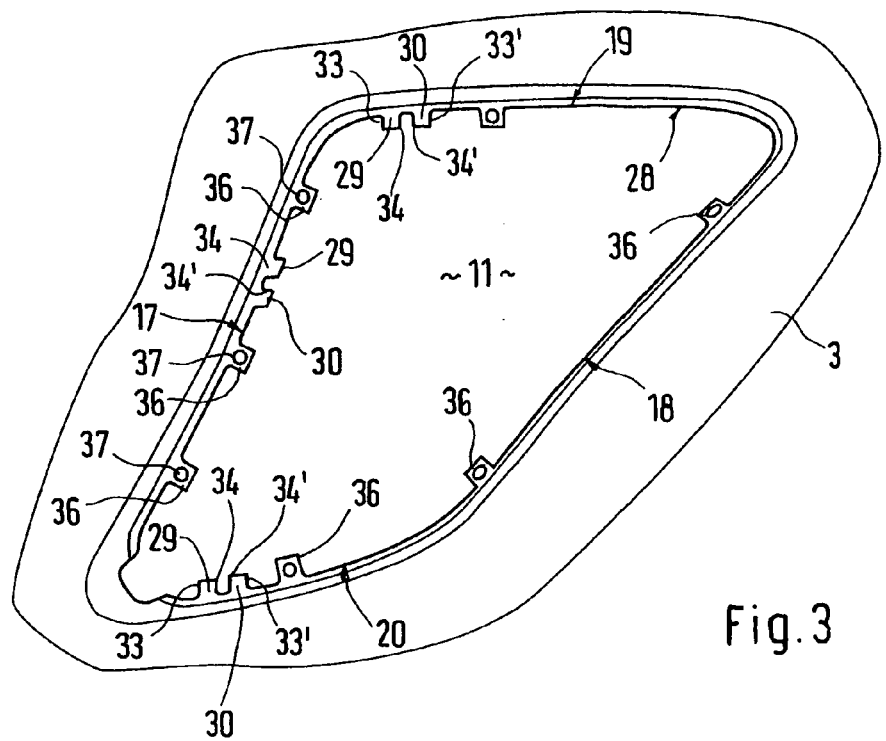
FIG. 3 is a partial lateral view of the vehicle body skin part of FIG. 1 with the provided opening but without the inserted air conduction scoop and without the flow-through conduit.

The rear area of a vehicle 1 illustrated in FIG. 1 comprises side doors 2, a stationary vehicle body skin part 3 arranged behind the latter, wheels 4, rear-side lamp units 5 and an outer covering part 6 for a bumper not shown in detail. By means of lateral sections 7, the covering part 6 extends to adjacent rear wheel houses 8.

In the rear area, an air inlet conduit 9 for a charge air cooler not illustrated in detail is provided on each longitudinal vehicle side. On its air inlet side 10, the air inlet conduit has an air conduction scoop 12 inserted into an opening 11 of the vehicle body skin part 3, and a flow-through conduit 13 adjoining the air conduction scoop 12. The discharge of the air guided through the charge air cooler takes place by lateral discharge slots 14 arranged on the covering part 6. In the embodiment shown, the vehicle body skin part 3 is formed by a rearward side part.

Adjacent to the rear edge 15 of the door 2 and slightly below the belt line 16, the opening 11 is constructed on the vehicle body skin part 3, which opening 11 has an approximately four-cornered basic shape with rounded transition areas between the individual sides. A front side 17 of the opening 11 extends in areas parallel to the rear edge 15 of the door, whereas a rearward side 18 is set to be slightly flatter. A top side 19 and a bottom side 20 of the opening 11 are slightly sloped upward toward the rear with respect to a horizontal auxiliary plane. The air conduction scoop 12 is inserted from the exterior side of the vehicle into the opening 11 of the vehicle body skin part 3, the air conduction scoop 12 being supported by way of a surrounding collar section 21 on a second exterior step-shaped indentation 22 of the vehicle body skin part 3. A scoop section 23 projecting into the hollow space of the vehicle body situated behind the collar section 21 extends away from the collar section 21, in the embodiment shown, the scoop section 23 being divided into two sections situated above one another by means of an approximately horizontally extending rib 24.

Figure 6:
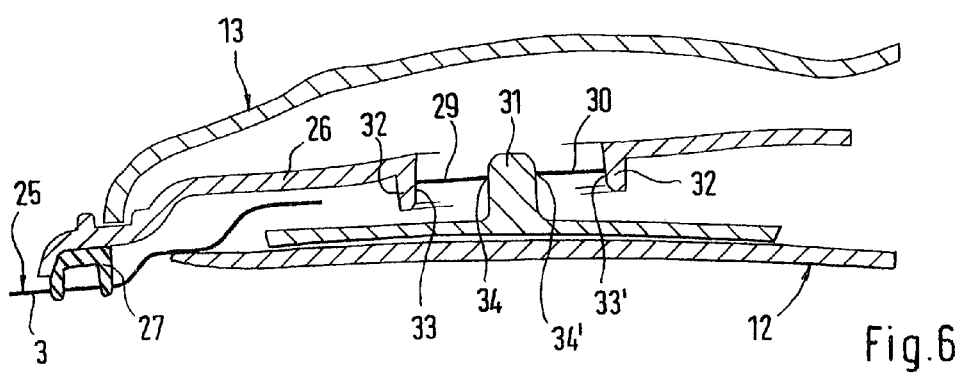
FIG. 6 is an enlarged sectional view taken along Line VI—VI of FIG. 4.
Figure 7:
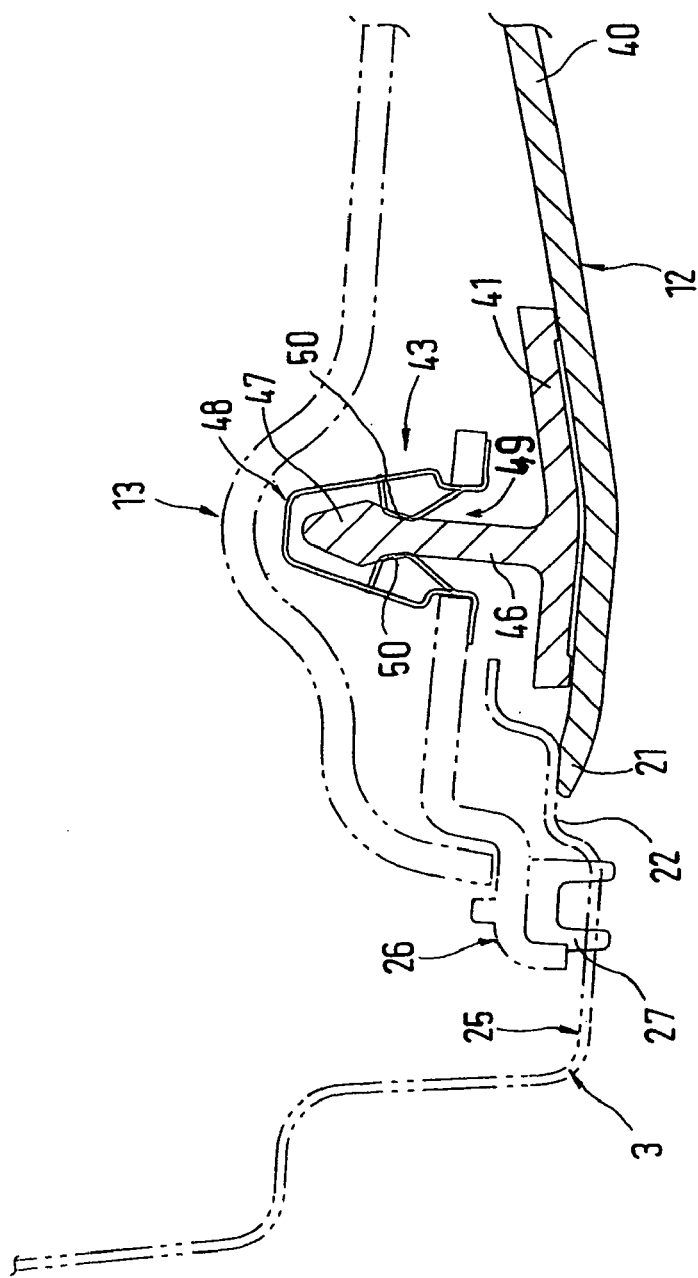
FIG. 7 is an enlarged sectional view taken along Line VII—VII of FIG. 4.

The air conduction scoop 12 may also have more or fewer ribs 24, which may also be arranged to extend vertically or to be sloped. The flow-through conduit 13 extends to the interior side 25 of the vehicle body skin part 3 and, adjacent to the opening 11, has an end-side ring-shaped frame part 26, which receives a surrounding sealing body 27 (FIGS. 6 and 7).

For correctly positioning the air conduction scoop 12 and/or the flow-through conduit 13, according to the invention, several trim lugs 29, 30 are provided on the edge 28 of the opening 11 which are arranged in pairs, project into the opening 11 and form-lockingly interact with positioning pins 31 or positioning sections 32 of the air conduction scoop 12 and of the flow-through conduit 13.

Figure 4:
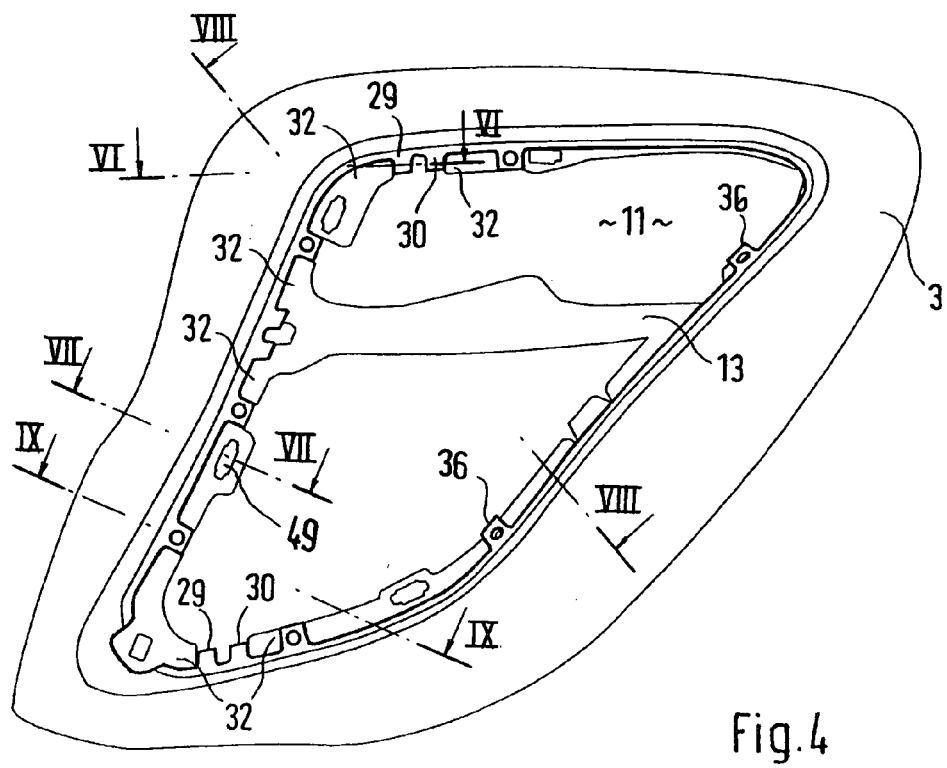
FIG. 4 is a partial lateral view of the vehicle body skin part with the inserted flow-through conduit.
Figure 5:
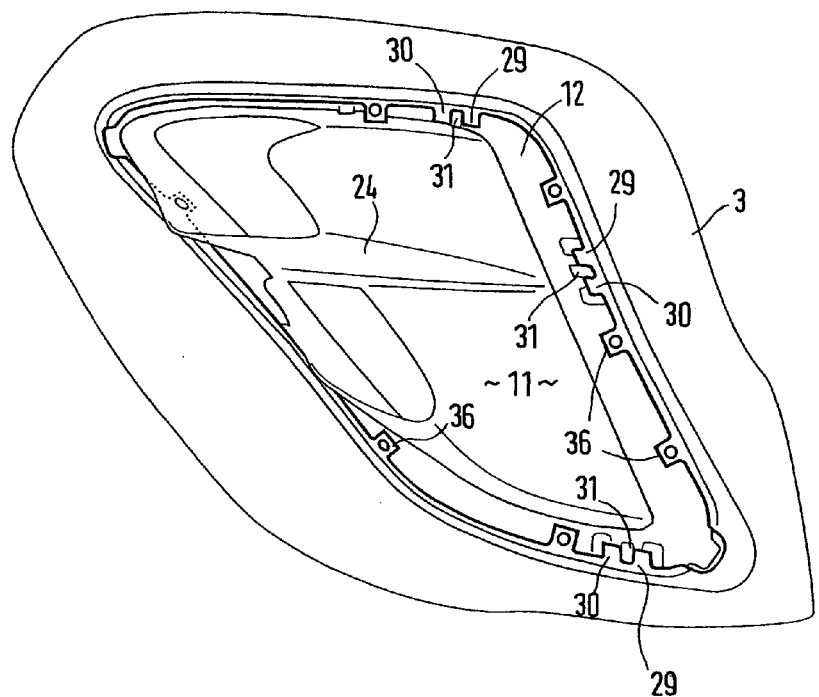
FIG. 5 is a view from the interior onto the vehicle body skin part with the inserted air conduction scoop.

In the embodiment shown, two spaced rectangular trim lugs 29, 30 respectively are provided on the top side 19, the bottom side 20 and the front side 17, which are stamped out during the production of the vehicle body skin part 3. The outer edges 33, 33' of the trim lugs 29, 30 are used as a receiving device for the flow-through conduit 13, whereas the inner edges 34, 34' of the trim lugs 29, 30 are used as the receiving device for the air conduction scoop 12. In the embodiment shown, the projecting positioning pins 31 are assigned to the air conduction scoop 12, in which case each positioning pin 31 form-lockingly interacts with two spaced inner edges 34, 34' of the trim lugs 29, 30 as well as the base of the receiving device situated in-between. Two positioning sections 32, which are in each case arranged in a spaced manner in the positioning areas, are constructed on the flow-through conduit 13, which positioning sections 32 form-lockingly interact with the outer edges 33, 33' of the two trim lugs 29, 30 (FIGS. 4 to 6).

The trim lugs 29, 30 on the top and bottom side 19, 20 each extend in the vertical direction; whereas, on the front side 17 of the opening 11, the trim lugs 29, 39 are horizontally oriented. By means of the vertically extending trim lugs 29, 30, a respective positioning takes place in the X-direction, whereas the horizontally oriented trim lugs 29, 30 cause a positioning in the Z-direction. As a result of the support in the Y-direction, the double fixing in the X-direction and additional positioning in the Z-direction, all degrees of freedom are defined, and the components 12, 13 are positioned in an unambiguous manner.

Figure 9:
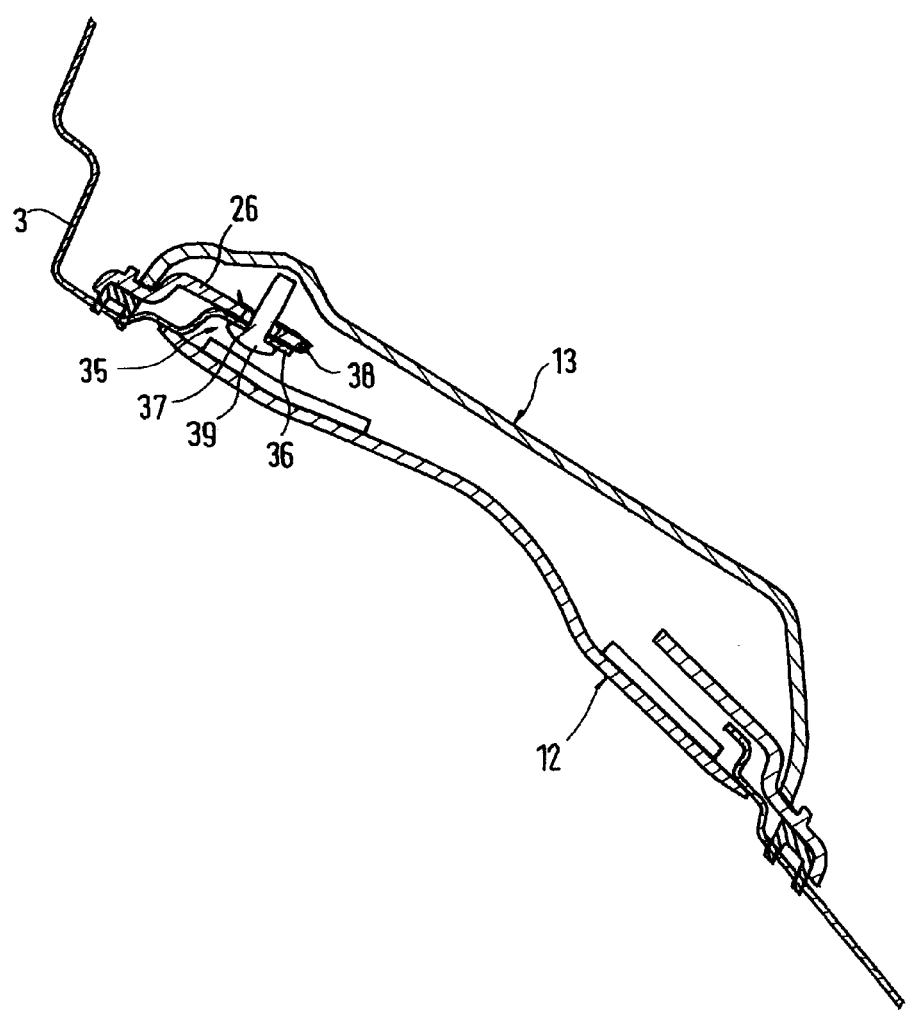
FIG. 9 is an enlarged sectional view taken along Line IX—IX of FIG. 4.

The inner flow-through conduit 13 is fastened by way of several releasable connections 35, preferably screwed connections, to the vehicle body skin part 3 (FIG. 9). For this purpose, projecting holding lugs 36 with a passage openings 37 are provided in fastening areas of the flow-through conduit 13 on the edge side at the opening 11 of the vehicle body skin part 3. A threaded nut or a sheet metal nut 38 is fitted onto an edge area of the adjoining frame part 26 of the flow-through conduit 13, which edge area is also provided with a passage opening. A fastening screw 39 can be screwed into the threaded nut or sheet metal nut 38 from the exterior side of the vehicle.

The air conduction scoop 12 consists of an outer air inlet cover 40 and a surrounding inner holding frame 41. Both components 40, 41 are glued to one another in a correct position in a gauge not shown in detail.

Figure 8:
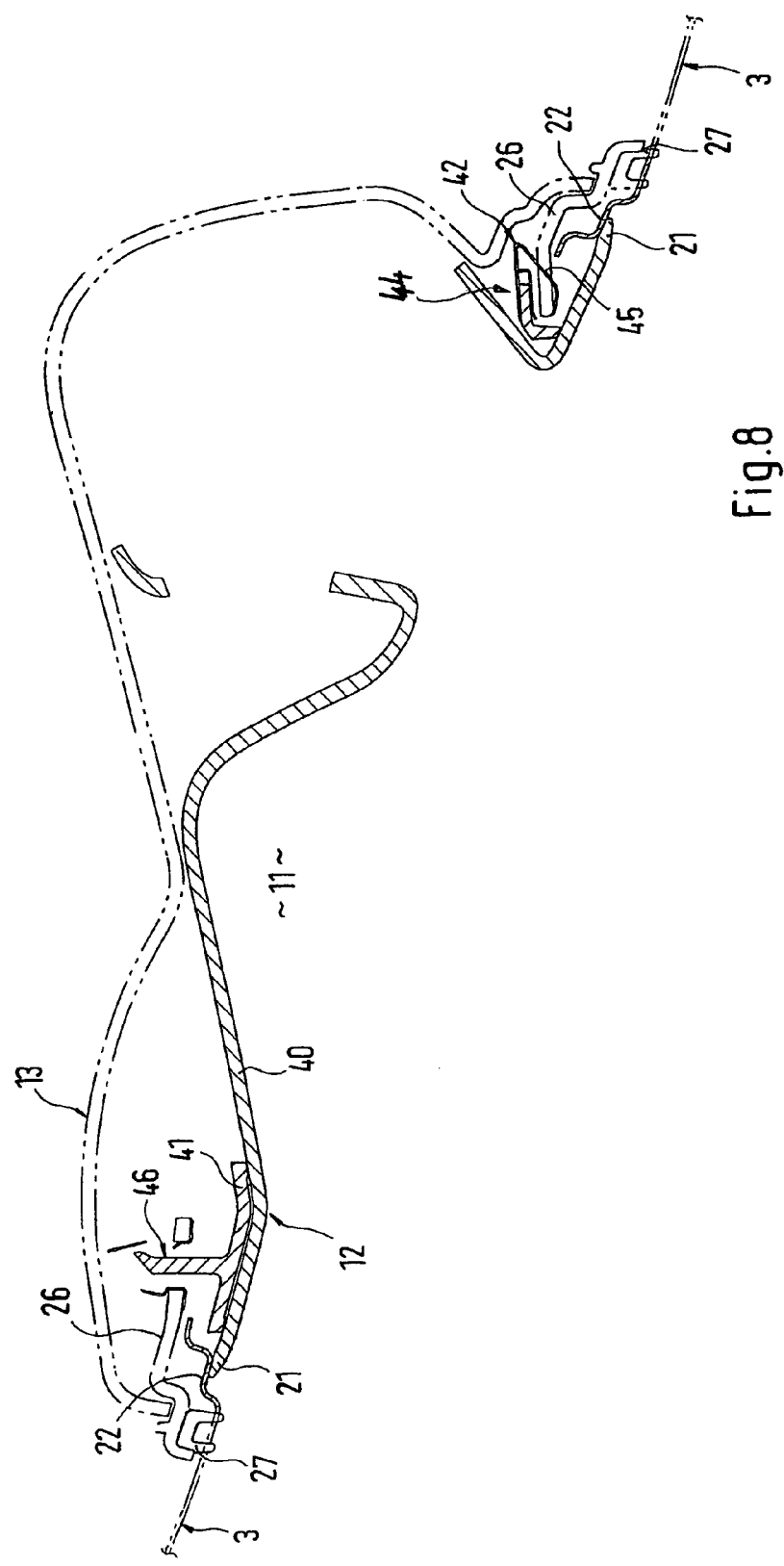
FIG. 8 is an enlarged sectional view taken along Line VIII—VIII of FIG. 4.

A hidden fastening concept for the air conduction scoop 12 is achieved in that the latter is held in position by way of at least one spring element 42 and at least one releasable detent connection (FIGS. 7 and 8). In the embodiment shown, two spring elements 42 are provided on the rearward edge area 44 of the air conduction scoop 12, which are arranged above one another and are supported by means of a resilient inner leg 45 in a prestressed manner on the adjacent flow-through conduit 13. By means of U-shaped fastening sections, the spring elements 42 are fitted onto the free end of the inner holding frame 41. The inner holding frame 41 reaches behind a forward edge area of the flow-through conduit 13 (FIG. 8).

Furthermore, the outer air conduction scoop 12 is connected by way of several releasable detent connections 43 with the inner flow-through conduit 13. For this purpose, locally molded-on webs 46 with end-side profiled detent noses 47 are provided on the inner holding frame 41 of the air conduction scoop 12, which detent noses 47 interact in a locking manner with holding clamps 48 of the flow-through conduit 13. The holding clamps 48 are inserted from the exterior side of the vehicle into recesses 49 of the end-side frame part 26 of the flow-through conduit 13 and have two bent-away, inward-projecting holding tongues 50 which interact in a clamping manner with the detent noses 47 of the air conduction scoop 12 (FIG. 7).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Air inlet conduit for a cooler of a vehicle, which on air inlet side thereof has an air conduction scoop inserted into an opening of a vehicle body skin part and is supported by a surrounding collar section on an exterior side of the vehicle body skin part, a scoop section extending away from the outer collar section of the air conduction scoop, which scoop section projects into a hollow space of the vehicle body skin part situated behind the skin part, the air conduction scoop being connected to an adjoining closed flow-through conduit, wherein several trim lugs are arranged in pairs on an edge of the opening and project into the opening, said trim lugs interacting in a form-locking manner with positioning pins or positioning sections of at least one of the air conduction scoop and the flow-through conduit, outer edges of the trim lugs are used as a receiving device for the flow-through conduit, and inner edges of the trim lugs are used as a receiving device for the air conduction scoop.

2. Air inlet conduit according to claim 1, wherein the trim lugs are respectively, spaced and are provided on a top side, a bottom side and a front side of the opening.

3. Air inlet conduit according to claim 1, wherein projecting position pins are molded onto the air conduction scoop which form-lockingly interact with the receiving device formed by the inner edges of the spaced trim lugs when the air conduction scoop is mounted.

4. Air inlet conduit according to claim 3, wherein two spaced positioning sections respectively are provided on the flow-through conduit in the area of the trim lugs, which positioning sections form-lockingly interact with the outer edges of the trim lugs.

5. Air inlet conduit according to claim 1, wherein two spaced positioning sections respectively are provided on the flow-through conduit in the area of the trim lugs, which positioning sections form-lockingly interact with the outer edges of the trim lugs.

6. Air inlet conduit according to claim 1, wherein the flow-through conduit is fastened to the vehicle body skin part by means of releasable connections.

7. Air inlet conduit according to claim 6, wherein holding lugs with one passage opening respectively are provided in fastening areas for the flow-through conduit on the edge side at the opening of the vehicle body skin part, a threaded nut being fittable on each holding lug, into which threaded nut a fastening screw can be screwed for fastening the flow-through conduit.

8. Air inlet conduit according to claim 1, wherein the flow-through conduit is fastened to the vehicle body skin part by means of releasable connections.

9. Air inlet conduit according to claim 8, wherein holding lugs with one passage opening respectively are provided in fastening areas for the flow-through conduit on the edge side at the opening of the vehicle body skin part, a threaded nut being fittable on each holding lug, into which threaded nut a fastening screw can be screwed for fastening the flow-through conduit.

10. Air inlet conduit according to claim 1, wherein the air conduction scoop interacts with the vehicle body skin part by means of at least one spring element.

11. Air inlet conduit according to claim 1, wherein the outer air conduction scoop is connected with the inner flow-through conduit by means of releasable detent connections.

12. Air inlet conduit according to one claim 1, wherein the air conduction scoop comprises an outer air inlet cover and an inner surrounding holding frame, which glued to one another in a correct position in a gauge.

13. Air inlet conduit according to claim 12, wherein locally molded-on webs with end-side detent noses are provided on the holding frame, which detent noses interact with holding clamps of the flow-through conduit in a locking manner.

14. Air inlet arrangement for a vehicle cooler, comprising:
an air inlet scoop which in use projects into a hollow space under an exterior vehicle body skin part, and
a flow through conduit disposed in use connected with and downstream of the air inlet scoop,
wherein the body skin part includes an air inlet opening having a plurality of trim lugs arranged in pairs around the air inlet opening and projecting into the air inlet opening, and
wherein positioning structure is provided on at least one of the air inlet scoop and the flow through conduit, which positioning structure form lockingly engages with the trim lugs to position the at least one of the air inlet scoop and the flow through conduit with respect to the vehicle body skin part, and said positioning structure includes positioning sections on said flow through conduit which form lockingly engage outer edges of respective lugs of respective pairs of said trim lugs.

15. Air inlet arrangement according to claim 14, wherein said positioning structure includes positioning pins on said air conduction scoop which form lockingly engage inner facing edges of lugs of respective ones of said pairs of said trim lugs.

16. Air inlet arrangement according to claim 15, wherein said positioning pins are molded onto the air conduction scoop.

17. Air inlet arrangement according to claim 14, wherein said positioning pins are molded onto the air conduction scoop.

18. Air inlet arrangement according to claim 14, wherein the flow-through conduit is releasably fastened to the vehicle body skin part.

19. Air inlet arrangement according to claim 18, wherein holding lugs with one passage opening respectively are provided in fastening areas for the flow-through conduit on the edge side at the opening of the vehicle body skin part, a threaded nut being fittable on each holding lug, into which threaded nut a fastening screw can be screwed for fastening the flow-through conduit.

20. Air inlet arrangement according to claim 14, wherein the air inlet scoop interacts with the vehicle body skin part via at least one spring element.

21. Air inlet arrangement according to claim 14, wherein the air inlet scoop is connected with the flow-through conduit via releasable detent connections.

22. Air inlet arrangement according to claim 14, wherein the air inlet scoop comprises an outer air inlet cover and an inner surrounding holding frame, which are glued to one another in a correct position in a gauge.

23. Air inlet arrangement according to claim 22, wherein locally molded-on webs with end-side detent noses are provided on the holding frame, which detent noses interact with holding clamps of the flow-through conduit in a locking manner.

* * * * *